(12) United States Patent
Krasnoff

(10) Patent No.: US 12,375,032 B2
(45) Date of Patent: Jul. 29, 2025

(54) SOLAR PANEL SYSTEM

(71) Applicant: DUPLICENT, LLC, Santa Monica, CA (US)

(72) Inventor: Curren Emmett Krasnoff, Santa Monica, CA (US)

(73) Assignee: Duplicent, LLC, Santa Monica, CA (US)

( * ) Notice: Subject to any disclaimer, the term of this patent is extended or adjusted under 35 U.S.C. 154(b) by 151 days.

(21) Appl. No.: 17/822,987

(22) Filed: Aug. 29, 2022

(65) Prior Publication Data

US 2023/0344383 A1     Oct. 26, 2023

Related U.S. Application Data

(63) Continuation of application No. PCT/US2021/034136, filed on May 26, 2021.

(60) Provisional application No. 63/080,848, filed on Sep. 21, 2020.

(51) Int. Cl.
*H02S 40/22* (2014.01)

(52) U.S. Cl.
CPC .................................. *H02S 40/22* (2014.12)

(58) Field of Classification Search
None
See application file for complete search history.

(56) References Cited

U.S. PATENT DOCUMENTS

| | | |
|---|---|---|
| 2004/0084077 A1 | 5/2004 | Aylaian |
| 2010/0154866 A1 | 6/2010 | Khan |
| 2012/0097213 A1 | 4/2012 | Weidner |
| 2012/0273023 A1* | 11/2012 | Ely ........................ F24S 30/425 136/246 |
| 2013/0104962 A1* | 5/2013 | Weibezahn ........ G02B 19/0023 136/246 |
| 2017/0047887 A1* | 2/2017 | Hilliard .................... F24S 23/75 |
| 2018/0040794 A1* | 2/2018 | Tarabishi ............ H01L 31/0547 |
| 2019/0371952 A1* | 12/2019 | Zhou .................... H01L 31/0504 |
| 2019/0393372 A1* | 12/2019 | Brugman ............ H01L 31/0547 |

FOREIGN PATENT DOCUMENTS

| | | |
|---|---|---|
| JP | 2012-038883 A | 2/2012 |
| KR | 10-2012-0096183 * | 8/2012 |
| WO | WO 2019/145927 A1 | 8/2019 |

OTHER PUBLICATIONS

English language machine translation of KR-10-2012-0096183. (Year: 2023).*
International Preliminary Report on Patentability in International Appln. No. PCT/US2021/034136, mailed on Mar. 30, 2023, 8 pages.
International Search Report and Written Opinion in International Appln. No. PCT/US2021/034136, mailed on Sep. 7, 2021, 10 pages.

* cited by examiner

*Primary Examiner* — Eli S Mekhlin
(74) *Attorney, Agent, or Firm* — Fish & Richardson P.C.

(57) ABSTRACT

A solar panel system includes a solar module. The solar module includes a housing, a solar panel, and a reflector. The solar panel is supported by the housing. The solar panel is configured to receive incident light and convert a first portion of the incident light to electricity. The reflector is positioned to reflect a second portion of the incident light that was not converted to electricity by the solar panel back at the solar panel.

17 Claims, 5 Drawing Sheets

SOLAR PANEL SYSTEM

CROSS-REFERENCE TO RELATED APPLICATION

This application is a continuation of International Patent Application No. PCT/US2021/034136, filed May 26, 2021, which claims the benefit of and priority to U.S. Provisional Patent Application No. 63/080,848, filed Sep. 21, 2020, all of which are incorporated herein by reference in their entireties.

BACKGROUND

A solar panel is a packaged assembly of photovoltaic cells. Solar panels use light energy (e.g., photons) from a light source (e.g., the sun) to generate an electric current via the photovoltaic effect. A solar panel is typically used to generate and supply electricity to a load device or system. Solar panels are an environmentally friendly alternative to other sources of energy such as coal, oil, natural gas, or gasoline.

SUMMARY

One embodiment relates to a solar panel system. The solar panel system includes a solar module. The solar module includes a housing, a solar panel, and a reflector. The solar panel is supported by the housing. The solar panel is configured to receive incident light and convert a first portion of the incident light to electricity. The reflector is positioned to reflect a second portion of the incident light that was not converted to electricity by the solar panel back at the solar panel.

In some embodiments, the solar panel is transparent and the second portion of the incident light is light that passes through the solar panel.

In some embodiments, the solar panel includes a plurality of transparent solar panels arranged in a stacked configuration.

In some embodiments, the solar cell layer includes a plurality of solar cell layers arranged in a stacked configuration.

In some embodiments, the solar panel has a thickness between three inches and twelve inches.

In some embodiments, the reflector is positioned at the opposing second side of the housing.

In some embodiments, the reflector is a mirror or a reflective film.

In some embodiments, the reflector is a reflective coating or a reflective film disposed along a rear surface of the solar panel.

In some embodiments, the reflector is a panel having a reflective coating or a reflective film disposed therealong.

In some embodiments, the reflector is a first reflector and the solar module includes a second reflector positioned at or proximate the first side of the housing.

In some embodiments, the second reflector is a one-way window (e.g., a clear panel having a reflective coating or a reflective film disposed along an interior side thereof).

In some embodiments, the solar module includes a panel extending across the upper side of the housing, the panel including a plurality of flaps that are selectively openable and closeable to provide slits within the panel, and wherein the second reflector is positioned along an interior face of the panel.

In some embodiments, the slits vary in size across the panel.

In some embodiments, the solar panel system includes a cooling system configured to provide at least one of a cooled working fluid or an airflow to at least one of an interior of the solar module or an internal channel of the reflector.

In some embodiments, the cooling system is configured to provide both the cooled working fluid and the airflow to the interior of the solar module.

In some embodiments, the solar panel system includes a controller configured to monitor a temperature within the interior of the solar module and control the cooling system to maintain the temperature within a desired operating range.

In some embodiments, the solar module includes a dichroic element positioned at the first side of the housing.

In some embodiments, the reflector includes a series of triangle, pyramid, or conical-shaped elements.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The efficiency of solar panels has a direct impact on their ability to generate electricity. The higher the efficiency, the more benefit a solar panel can provide as a clean, pollution free source of electricity. According to an exemplary embodiment, the solar panel system disclosed herein increases the efficiency of the conversion of sunlight to electricity relative to the current commercially available solar panel systems. Traditionally, current commercially available solar panels have photovoltaic cells that are manufactured using an opaque, non-translucent crystalline silicone material. The photovoltaic cells of the solar panels of the solar panel system of the present disclosure are manufactured from a translucent or transparent silicone material or other material such that light passes through the solar panels. The solar panels can be stacked or the solar panels can include multiple stacked layers of photovoltaic cells and then arranged into a solar module. Light incident on the solar module is converted to electricity and is harvested as the light continues to penetrate through the solar module. The solar module may include one or more reflective layers (e.g., reflective films, reflective coatings, mirrors, one-way mirrors/windows, etc.) positioned to redirect light within the solar module back at the solar panel(s) therein.

As shown in FIGS. 1-4, a panel, shown as solar panel 10, includes a first surface, shown as front surface 12, and an opposing second surface, shown as rear surface 14. The front surface 12 is separated from the rear surface 14 by a thickness of the solar panel 10, according to an exemplary embodiment. As shown in FIGS. 1-4, the solar panel 10 includes at least one cell layer, shown as solar cell layer 16, disposed within the solar panel 10 between the front surface 12 and the rear surface 14. In some embodiments, a clear layer (e.g., glass, clear plastic, a clear coating, a clear film, etc.) provides the front surface 12 and is disposed along the solar cell layer 16. In another embodiment, the solar cell layer 16 provides the front surface 12. According an exemplary embodiment, the solar cell layer 16 includes a plurality of photovoltaic cells.

Figure 1:
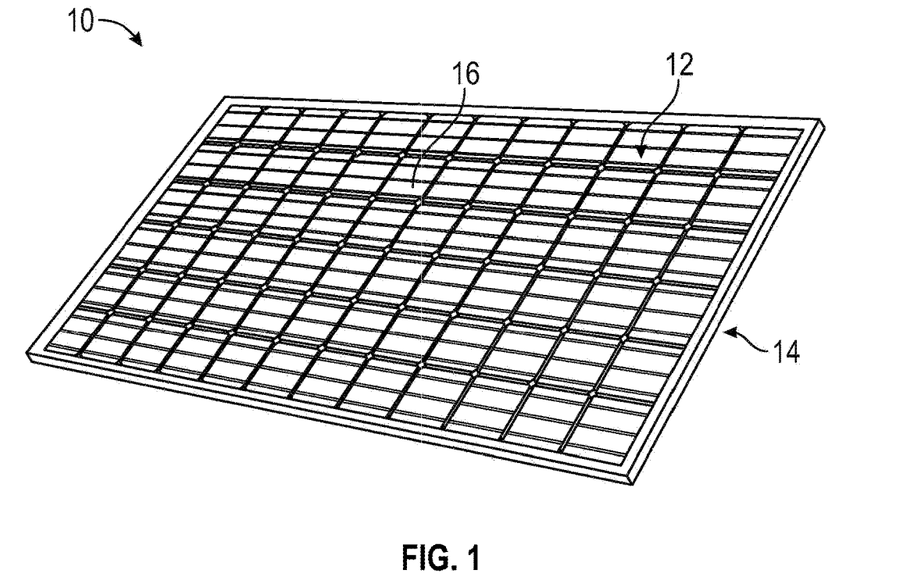
FIG. 1 is a perspective view of a solar panel, according to an exemplary embodiment.
Figure 2:
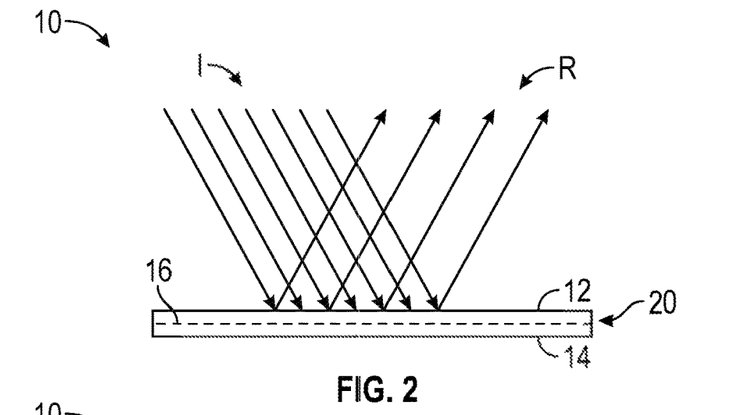
FIG. 2 is a side view of the solar panel of FIG. 1, according to an exemplary embodiment.
Figure 3:
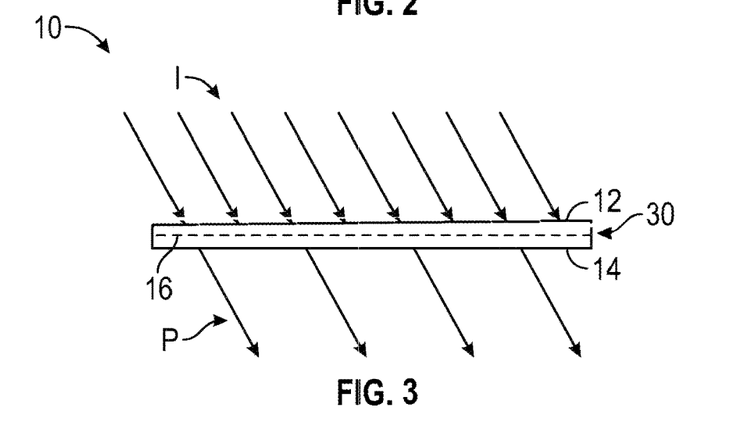
FIG. 3 is a side view of the solar panel of FIG. 1, according to another exemplary embodiment.
Figure 4:
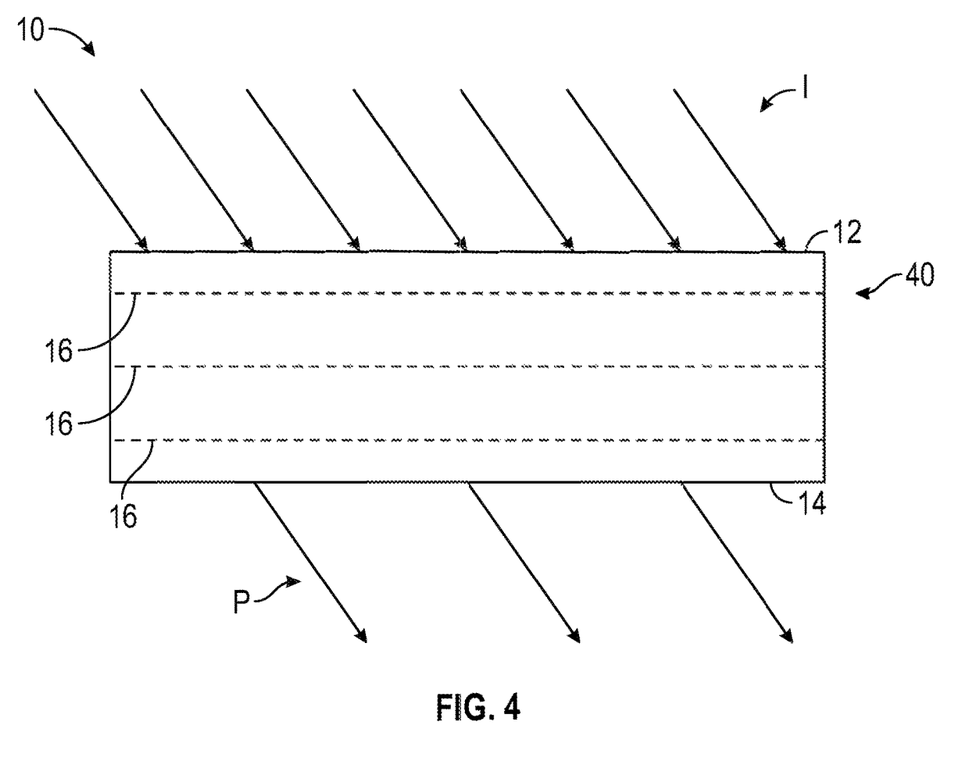
FIG. 4 is a side view of the solar panel of FIG. 1, according to still another exemplary embodiment.

As shown in FIGS. 2-4, the solar panel 10 is configured to receive incident light I from a light source (e.g., the sun, etc.) and the one or more solar cell layers 16 (i.e., the photovoltaic cells thereof) are configured to convert at least a portion of the incident light I to generate electricity. According to the exemplary embodiment shown in FIG. 2, the solar panel 10 is configured as a conventional solar panel, shown as non-transparent solar panel 20. The solar cell layer 16 of the non-transparent solar panel 20 may, therefore, include photovoltaic cells that are manufactured using an opaque, non-translucent crystalline silicone material. Accordingly, when the incident light I interacts with the non-transparent solar panel 20, a first portion (e.g., a majority) of the incident light I is converted by the solar cell layer 16 into electricity and a second portion of the incident light I may be reflected by the non-transparent solar panel 20 as reflected light R.

According to the exemplary embodiment shown in FIG. 3, the solar panel 10 is configured as a non-conventional, translucent solar panel, shown as transparent solar panel 30. The solar cell layer 16 of the transparent solar panel 30 may, therefore, include photovoltaic cells that are manufactured from an at least partially translucent or transparent material (e.g., a transparent silicone material, a transparent material, a semi-transparent material, etc.) such that light passes therethrough. Accordingly, when the incident light I interacts with the transparent solar panel 30, a first portion of the incident light I is converted by the solar cell layer 16 into electricity and a second portion of the incident light I passes through the transparent solar panel 30 as pass-through light P.

According to the exemplary embodiment shown in FIG. 4, the solar panel 10 is configured as another non-conventional, translucent solar panel, shown as stacked-cell transparent solar panel 40, having a plurality of the solar cell layers 16 (e.g., two, three, four, five, six, etc. cell layers) arranged in a stacked configuration therein. The solar cell layers 16 of the stacked-cell transparent solar panel 40 may, therefore, include photovoltaic cells that are manufactured from a translucent or transparent material (e.g., a transparent silicone material, etc.) such that light passes therethrough. Accordingly, when the incident light I interacts with the stacked-cell transparent solar panel 40, a first portion of the incident light I is converted by the solar cell layers 16 into electricity and a second portion of the incident light I passes through the stacked-cell transparent solar panel 40 as pass-through light P (though, the energy of pass-through light P, if any, may be less relative to the transparent solar panel 30). The stacked-cell transparent solar panel 40 may have a larger thickness relative to traditional solar panels. By way of example, the stacked-cell transparent solar panel 40 may have a thickness ranging from three to twelve inches. However, the thickness may be less than three inches or greater than twelve inches depending on the planned use of the stacked-cell transparent solar panel 40.

According to the various exemplary embodiments shown in FIGS. 5-8, a module, shown as solar module 100, includes one or more of the non-transparent solar panels 20, one or more of the transparent solar panels 30, and/or one or more of the stacked-cell transparent solar panels 40. As shown in FIGS. 5-8, the solar module 100 includes a housing, shown as panel housing 110, having a first side, shown as upper side 112, and an opposing second side, shown as lower side 114, separated by a distance to define an interior cavity, shown as inner chamber 116. The inner chamber 116 receives and supports one or more of the solar panels 10 (e.g., one or more of the non-transparent solar panels 20, one or more of the transparent solar panels 30, one or more of the stacked-cell transparent solar panels 40, etc.). According to an exemplary embodiment, the panel housing 110 supports the solar panel(s) 10 and facilitate coupling the solar module 100 to a racking assembly for attachment to a structure (e.g., a roof, a building, the ground, etc.).

In one embodiment, the upper side 112 is open to the surrounding environment. In such an embodiment, the front surface 12 of one of the solar panels 10 disposed within the panel housing 110 may provide the front surface of the solar module 100. In another embodiment, the upper side 112 includes a clear or transparent element (e.g., a panel, a glass panel, a plastic panel, a film layer, a coating layer, etc.). In some embodiments, as described in more detail herein, the clear or transparent element includes a reflective layer (e.g., a reflective coating, a reflective film, etc.) disposed therealong (e.g., along an interior surface of the clear or transparent element). In such embodiments, the clear or transparent element may be or function like a one-way window or a one-way mirror.

In one embodiment, the lower side 114 is or include an opaque element (e.g., an opaque panel, a metal panel, a wood panel, a plastic panel, a carbon fiber panel, etc.). In another embodiment, the lower side 114 includes a clear or transparent element (e.g., a panel, a glass panel, a plastic panel, a film layer, a coating layer, etc.). In such an embodiment, the solar module 100 may be or function like a solar window. In still another embodiment, the lower side 114 is open to the surrounding environment. In such an embodiment, the rear surface 14 of one of the solar panels 10 disposed within the panel housing 110 may provide the rear surface of the solar module 100 and the solar module 100 may be or function like a solar window. In yet another embodiment, as described in more detail herein, (i) the opaque element, (ii) the clear or transparent element, and/or (iii) the rear surface 14 of the solar panel 10 proximate the lower side 114 of the panel housing 110 is a reflective element (e.g., a mirror, etc.) or includes a reflective layer (e.g., a reflective coating, a reflective film, etc.) disposed therealong. In such embodiments, the reflective element or reflective layer functions like a mirror to reflect the pass-through light P back through the solar panel(s) 10 within the solar module 100.

Figure 5:
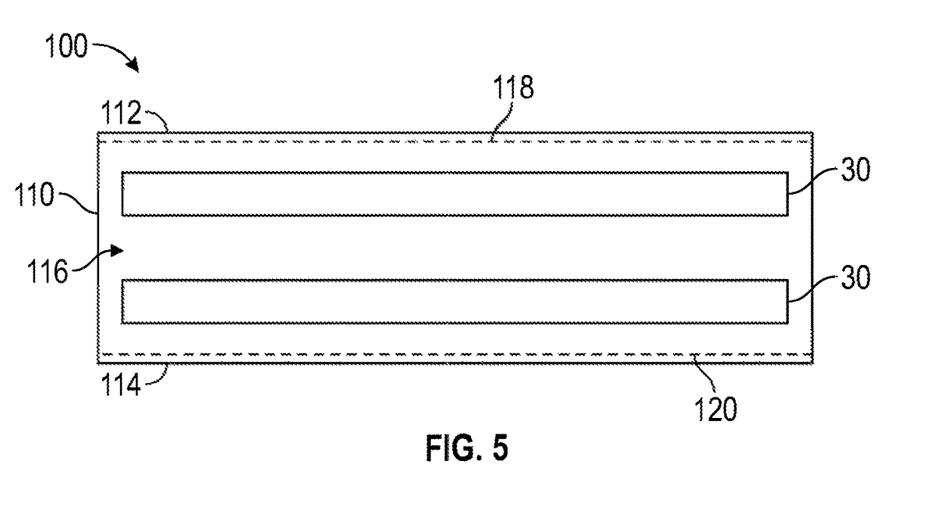
FIG. 5 is a cross-sectional view of a solar module including a plurality of the solar panels of FIG. 3, according to an exemplary embodiment.

As shown in FIG. 5, the solar module 100 includes a plurality of the transparent solar panels 30 arranged in a stacked configuration and disposed within the inner chamber 116 of the panel housing 110. While shown as including two transparent solar panels 30, in various other embodiments, the solar module 100 includes a single transparent solar panel 30 or three of more (e.g., three, four, five, etc.) transparent solar panels 30. As shown in FIG. 5, the upper side 112 of the panel housing 110 is separate from the uppermost transparent solar panel 30 in the stack. In another embodiment, the front surface 12 of the uppermost transparent solar panel 30 defines the upper side 112 of the panel housing 110. As shown in FIG. 5, the lower side 114 of the panel housing 110 is separate from the lowermost transparent solar panel 30 in the stack. In another embodiment, the rear surface 14 of the lowermost transparent solar panel 30 defines the lower side 114 of the panel housing 110.

According to the exemplary embodiment shown in FIG. 5, incident light I is configured to enter the solar module 100 through the upper side 112 and interact with the solar cell layer 16 of the uppermost transparent solar panel 30. A first portion of the incident light I is converted into electricity by the solar cell layer 16 of the uppermost transparent solar panel 30 and a second portion of the incident light I passes through the uppermost transparent solar panel 30 as pass-through light P. If there are additional transparent solar panels 30 in the stack, like shown in FIG. 5, the pass-through light P will similarly engage with the subsequent transparent solar panels 30, i.e., a first portion of the pass-through light P is converted into electricity by the solar cell layer 16 of the subsequent transparent solar panel 30 and a second portion of the pass-through light P passes through the subsequent transparent solar panel 30 to the following transparent solar panel 30, and so on.

Figure 6:
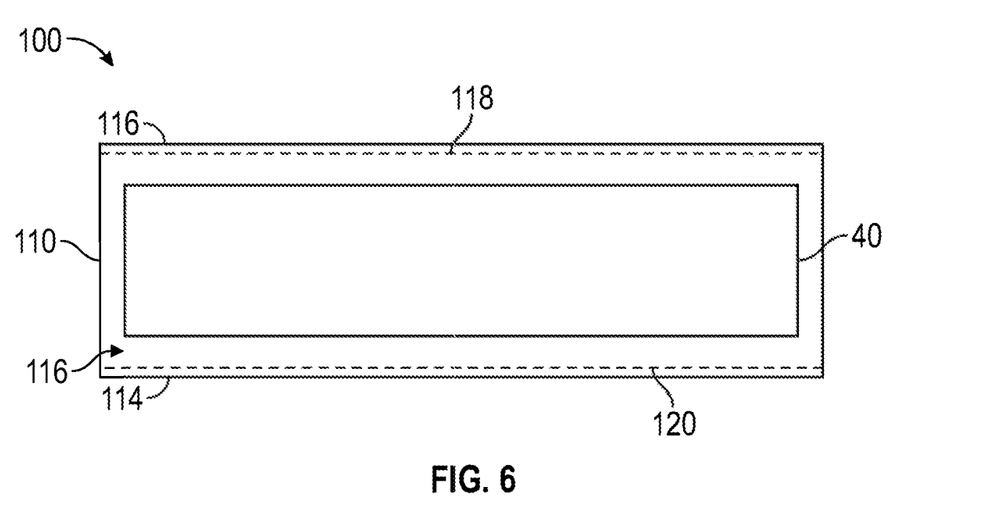
FIG. 6 is a cross-sectional view of a solar module including the solar panel of FIG. 4, according to an exemplary embodiment.

As shown in FIG. 6, the solar module 100 includes the stacked-cell transparent solar panel 40 disposed within the inner chamber 116 of the panel housing 110. While shown as including a single stacked-cell transparent solar panel 40, in other embodiments, the solar module 100 includes a plurality of the stacked-cell transparent solar panels 40 (e.g., two, three, four, etc.). In still other embodiments, the solar module 100 includes a combination of (i) one or more of the transparent solar panels 30 and (ii) one or more of the stacked-cell transparent solar panels 40 arranged in a stacked configuration.

As shown in FIG. 6, the upper side 112 of the panel housing 110 is separate from the front surface 12 of the stacked-cell transparent solar panel 40. In another embodiment, the front surface 12 of the stacked-cell transparent solar panel 40 defines the upper side 112 of the panel housing 110. As shown in FIG. 6, the lower side 114 of the panel housing 110 is separate from the rear surface 14 of the stacked-cell transparent solar panel 40. In another embodiment, the rear surface 14 of the stacked-cell transparent solar panel 40 defines the lower side 114 of the panel housing 110.

According to the exemplary embodiment shown in FIG. 6, incident light I is configured to enter the solar module 100 through the upper side 112 and interact with each of the plurality of solar cell layers 16 in succession as the incident light permeates through the stacked-cell transparent solar panel 40. By way of example, a first portion of the incident light I is converted into electricity by a first solar cell layer 16 in the stack, a second portion of the incident light I is converted into electricity by a second solar cell layer 16 in the stack, and so on until the incident light I reaches the rear surface 14 of the stacked-cell transparent solar panel 40 and exits therethrough as pass-through light P. If there are additional transparent solar panels 30 and/or stacked-cell transparent solar panels 40 arranged in a stacked configuration, the pass-through light P will similarly engage with the subsequent solar panels.

As shown in FIGS. 5 and 6, in some embodiments, the solar module 100 includes a first reflective portion, shown as upper reflector 118, and/or a second reflective portion, shown as lower reflector 120. In one embodiment, the upper reflector 118 is clear panel (e.g., glass, plastic, etc.) positioned at the upper side 112 of the panel housing 110 with a reflective film or a reflective coating applied thereto (e.g., along an interior surface thereof). In such an embodiment, the upper reflector 118 may be or function like a one-way window or a one-way mirror. The upper side 112 with the upper reflector 118 may, therefore, be configured to permit the incident light I to pass therethrough into the inner chamber 116 of the panel housing 110, but light reflected from within the inner chamber 116 at the upper reflector 118 is reflected back into the inner chamber 116. Stated another way, the upper reflector 118 may be or include a material that allows photons to pass through from the exterior of the solar module 100, but reflects photons on the inside of the solar module 100. The upper reflector 118 may, therefore, be a one-way window or one-way mirror that lets photons through from one side (e.g., the top side, the exterior side, for photons outside of the solar module 100, etc.) but reflects photons on the other side (e.g., the bottom side, the interior side, for photons inside the solar module 100, etc.). In some embodiments, the upper reflector 118 is semi-transparent. According to an exemplary embodiment, the upper reflector 118 is configured (e.g., designed, selected, etc.) such that a substantial portion of the incident light I passes through the upper reflector 118 and only a minor portion of the incident light I is prevented (e.g., reflected, blocked, etc.) from entering the inner chamber 116 of the panel housing 110.

In some embodiments, the upper reflector 118 is or includes a dichroic mirror, a dichroic film, or a dichroic coating (e.g., that reflects light of a certain color or colors and lets other colors pass through). In such embodiments, the upper reflector 118 may still allow light to pass through (i.e., of a certain color or colors) while still reflecting the light within the inner chamber 116. Therefore, in various embodiments, the upper reflector 118 functions like a one-way window or a one-way mirror, a dichroic reflector/mirror, or a one-way dichroic reflector/mirror. While the upper reflector 118 is shown as being substantially flat, in other embodiments, the upper reflector 118 may be curved (e.g., parabolic, hyperbolic, semi-spherical shaped, half-oval shaped, etc.). In one embodiment, the top surface (i.e., the exterior surface) of the upper reflector 118 is flat but the bottom surface (i.e., the interior surface) of the upper reflector 118 is curved. In another embodiment, the top surface and the bottom surface of the upper reflector 118 are similarly curved.

In one embodiment, the lower reflector 120 is a mirror positioned at the lower side 114 of the panel housing 110. In another embodiment, the lower reflector 120 is a panel (e.g., an opaque panel, a clear panel, etc.) positioned at the lower side 114 of the panel housing 110 with a reflective film or a reflective coating applied thereto (e.g., along an interior surface thereof). In still another embodiment, the lower reflector 120 is a reflective film extending across the lower side 114 of the panel housing 110. In yet another embodiment (e.g., an embodiment where the rear surface 14 of the lowermost transparent solar panel 30 defines the lower side 114 of the panel housing 110, an embodiment where the rear surface 14 of the stacked-cell transparent solar panel 40 defines the lower side 114 of the panel housing 110, etc.), the lower reflector 120 is integrated into the lowermost transparent solar panel 30 or the stacked-cell transparent solar panel 40. By way of example, the lower reflector 120 may include a reflective film or a reflective coating applied along the rear surface 14 of the lowermost transparent solar panel 30 or the stacked-cell transparent solar panel 40. The lower side 114 with the lower reflector 120 may, therefore, be configured and positioned to reflect the pass-through light P received from the one or more transparent solar panels 30 and/or the one or more stacked-cell transparent solar panel 40 back at the one or more transparent solar panels 30 and/or the stacked-cell transparent solar panel 40. In some embodiments, the lower reflector 120 (e.g., the mirror, the reflective film, the reflective coating, etc.) functions like a one-way mirror (similar to as described herein with respect to upper reflector 118).

In one embodiment, the lower reflector 120 includes a series of small, angled triangle, pyramid, or conical-shaped elements that reflects light at an angle (e.g., to the upper reflector 118). The triangle, pyramid, or conical-shaped elements may be moveable (e.g., with an actuator, a motor, controlled by the controller 210, etc.) to orient to the direction of the oncoming light. In some embodiments, the lower reflector 120 has a colored, transparent film over it. In such embodiments, the light may be filtered by the upper reflector 118 (e.g., if the upper reflector 118 is or includes the dichroic element, etc.) such that the light enters the inner chamber 116 as one color but remains trapped in the inner chamber 116 and changes to another color. While the lower reflector 120 is shown as being substantially flat, in other embodiments, the lower reflector 120 may be curved (e.g., parabolic, hyperbolic, semi-spherical shaped, half-oval shaped, etc.). In one embodiment, the top surface (i.e., the interior surface) of the lower reflector 120 is flat but the bottom surface (i.e., the exterior surface) of the lower reflector 120 is curved. In another embodiment, the top surface and the bottom surface of the lower reflector 120 are similarly curved.

In one embodiment, the solar module 100 does not include the upper reflector 118 nor the lower reflector 120, In such an embodiment, the incident light I enters the panel housing 110 of the solar module 100 through the upper side 112 thereof, passes through the one or more transparent solar panels 30 and/or the one or more stacked-cell transparent solar panel 40, and, if there is any residual light energy, the pass-through light P will interact with the lower side 114 (e.g., if an opaque panel is positioned at the lower side 114) or pass through the lower side 114 (e.g., if a clear panel is positioned at the lower side 114, if the lower side 114 is open, etc.).

In another embodiment, the solar module 100 includes the lower reflector 120, but does not include the upper reflector 118. In such an embodiment, the incident light I enters the panel housing 110 of the solar module 100 through the upper side 112, passes through the one or more transparent solar panels 30 and/or the one or more stacked-cell transparent solar panels 40, and, if there is any residual light energy, the pass-through light P reflects off of the lower reflector 120 at the lower side 114 of the panel housing 110 back to the one or more transparent solar panels 30 and/or the one or more stacked-cell transparent solar panels 40 to interact therewith. Therefore, in such an arrangement, light may interact with the one or more transparent solar panels 30 and/or the one or more stacked-cell transparent solar panels 40 in two directions: (i) light traveling downwards through the panel housing 110 that is received by the solar module 100 from the ambient environment (i.e., the incident light I and/or the pass-through light P received from a prior panel) and (ii) the pass-through light P traveling upwards through the panel housing 110 that is reflected by the lower reflector 120. Such an arrangement may allow the solar cell layer(s) 16 of the one or more transparent solar panels 30 and/or the one or more stacked-cell transparent solar panels 40 to harvest light energy in two directions (downwards and upwards). Such an arrangement may allow the solar module 100 to achieve an increased efficiency and a greater conversion rate of the light energy to electricity compared to the solar module 100 without the lower reflector 120. To facilitate two direction energy conversion, each of the solar cell layers 16 may include (i) a first set of photovoltaic cells oriented in a first direction (e.g., upwards) to receive the incident light I or the pass-through light P received from a prior panel and (ii) a second set of photovoltaic cells oriented in a second direction (e.g., downwards) to receive the pass-through light P reflected by the lower reflector 120.

In still another embodiment, the solar module 100 includes both the upper reflector 118 and the lower reflector 120. In such an embodiment, the incident light I enters the panel housing 110 of the solar module 100 through the upper reflector 118 at the upper side 112 of the panel housing 110, passes through the one or more transparent solar panels 30 and/or the one or more stacked-cell transparent solar panels 40, and, if there is any residual light energy, the pass-through light P reflects off of the lower reflector 120 back to the one or more transparent solar panels 30 and/or the one or more stacked-cell transparent solar panels 40 to interact therewith. The light traveling back through the one or more transparent solar panels 30 and/or the one or more stacked-cell transparent solar panels 40 may then reflect off the upper reflector 118. The incident light I that enters the panel housing 110 may, therefore, pass back and forth within the inner chamber 116 between the lower reflector 120 and the upper reflector 118 such that the solar panels 10 of the solar module 100 convert a substantial portion (e.g., 70%, 80%, 90%, 95%, etc.) of the available light energy to electricity.

Figure 7:
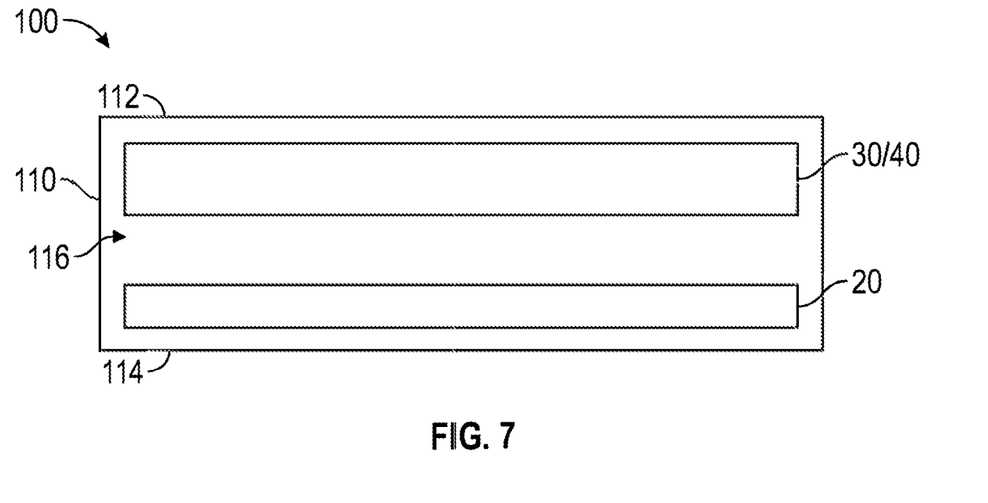
FIG. 7 is a cross-sectional view of a solar module including a plurality of solar panels including the solar panels from FIGS. 2, 3, and/or 4, according to an exemplary embodiment.

As shown in FIG. 7, the solar module 100 includes a combination of (i) one or more of the transparent solar panels 30 and/or one or more of the stacked-cell transparent solar panels 40 (e.g., a single transparent solar panel 30, a plurality of the transparent solar panels 30, a single stacked-cell solar panel 40, a plurality of the stacked-cell solar panel 40, one or more of the transparent solar panels 30 and one or more of the stacked-cell solar panels 40, etc.) and (ii) the non-transparent solar panel 20 arranged in a stacked configuration within the inner chamber 116 of the panel housing 110. As shown in FIG. 7, the upper side 112 of the panel housing 110 is separate from the transparent solar panel 30 or the stacked-cell transparent solar panel 40. In another embodiment, the front surface 12 of the transparent solar panel 30 or the stacked-cell transparent solar panel 40 defines the upper side 112 of the panel housing 110. As shown in FIG. 7, the lower side 114 of the panel housing 110 is separate from the non-transparent solar panel 20. In another embodiment, the rear surface 14 of the non-transparent solar panel 20 defines the lower side 114 of the panel housing 110.

According to the exemplary embodiment shown in FIG. 7, incident light I is configured to enter the solar module 100 through the upper side 112 and interact with the solar cell layer(s) 16 of the one or more transparent solar panels 30 and/or the one or more stacked-cell transparent solar panels 40. The pass-through light P not converted to electricity by the solar cell layer(s) 16 of the one or more transparent solar panels 30 and/or the one or more stacked-cell transparent solar panels 40 may then engage with the non-transparent solar panel 20, which converts the pass-through light P to electricity.

Figure 8:
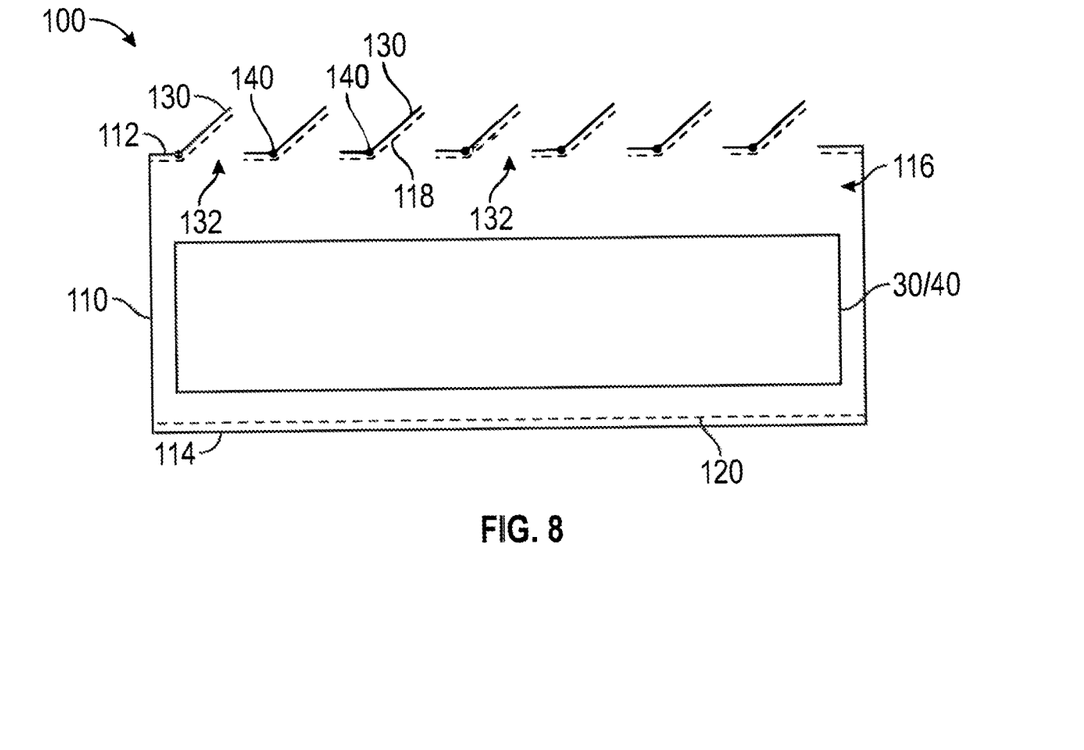
FIG. 8 is a cross-sectional view of a solar module having openable doors or slits, according to an exemplary embodiment.

As shown in FIG. 8, the solar module 100 includes (i) one or more of the transparent solar panels 30 and/or one or more of the stacked-cell transparent solar panels 40 (e.g., a single transparent solar panel 30, a plurality of the transparent solar panels 30, a single stacked-cell solar panel 40, a plurality of the stacked-cell solar panel 40, one or more of the transparent solar panels 30 and one or more of the stacked-cell solar panels 40, etc.) positioned within the inner chamber 116 of the panel housing 110, (ii) the upper reflector 118 disposed along an interior surface of the upper side 112 including an opaque panel enclosing the upper side 112, and (iii) the lower reflector 120 enclosing the lower side 114 (e.g., a mirror positioned at the lower side 114 of the panel housing 110, a reflective coating or film disposed along the rear surface 14 of the last solar panel, etc.). Accordingly, the inner chamber 116 of panel housing 110 and the panel(s) positioned therein are substantially isolated from light outside of the solar module 100.

However, as shown in FIG. 8, the panel on which the upper reflector 118 is disposed includes (i) a plurality of repositionable flaps, shown as doors 130, positioned along the panel (e.g., in rows) and (ii) actuators (e.g., electric actuators, motors, pneumatic actuators driven by an electric compressor, etc.), shown as door actuator 140, positioned to selectively open and close the doors 130 to provide channels, shown as slits 132, along the length of the panel at the upper side 112 of the panel housing 110 to allow incident light I to enter the inner chamber 116 of the panel housing 110. In one embodiment, the slits 132 are all the same width. In another embodiment, the size of the slits 132 varies along the panel. By way of example, the slits 132 proximate a first end of the panel may have a first width and the slits 132 proximate the opposing second end of the panel may have a second width less than the first width. The slits 132 may, therefore, transition gradually from the first width to the second width moving from the first end of the panel to the opposing second end of the panel (e.g., each subsequent slit 132 may narrow relative to the preceding slit 132, for example, by 0.25 inches, 0.5 inches, 1 inch, 2 inches, etc.).

In such an arrangement, the incident light I enters the panel housing 110 of the solar module 100 through the slits 132, passes through the one or more transparent solar panels 30 and/or the one or more stacked-cell transparent solar panels 40, and, if there is any residual light energy, the pass-through light P reflects off of the lower reflector 120 back to the one or more transparent solar panels 30 and/or the one or more stacked-cell transparent solar panels 40 to interact therewith The light traveling back through the one or more transparent solar panels 30 and/or the one or more stacked-cell transparent solar panels 40 may then reflect off the upper reflector 118. The incident light I that enters the panel housing 110 may, therefore, pass back and forth within the inner chamber 116 between the lower reflector 120 and the upper reflector 118 such that the solar panels 10 of the solar module 100 convert a substantial portion (e.g., 70%, 80%, 90%, 95%, etc.) of the available light energy to electricity.

Figure 9:
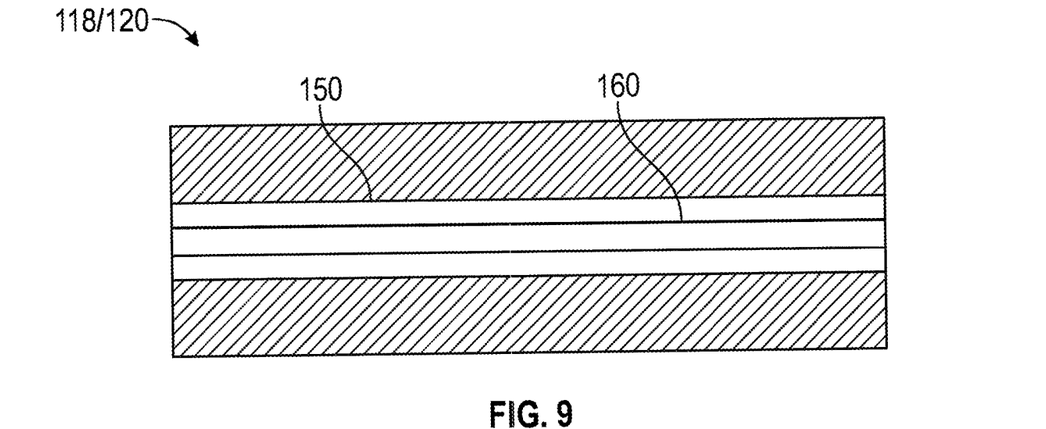
FIG. 9 is a cross-sectional view of a reflector of a solar module, according to an exemplary embodiment.

As shown in FIG. 9, the upper reflector 118 and/or the lower reflector 120 (i) define an internal cavity, shown as fluid channel 150, between the upper and lower surfaces thereof and (ii) include tubing, shown as fluid tubing 160, extending within and through the fluid channel 150. According to an exemplary embodiment, the fluid tubing 160 is transparent. In some embodiments, the upper reflector 118 and/or the lower reflector 120 do not include the fluid tubing 160. In some embodiments, the upper reflector 118 and/or the lower reflector 120 do not define the fluid channel 150. In such embodiments, the fluid tubing 160 may disposed along a surface (e.g., an interior surface) of the upper reflector 118 and/or lower reflector 120. In one embodiment, the fluid tubing 160 fits snuggly within the fluid channel 150. In another embodiment, the fluid tubing 160 has a smaller diameter than the fluid channel 150. By way of example, the fluid channel 150 may have a first diameter (e.g., 1 inch, 2 inches, 3 inches, 6 inches, 1 foot, 2 feet, 3 feet, 5 feet, 10 feet, etc.) and the fluid tubing 160 may have a second, smaller diameter (e.g., 0.5 inches, 1 inch, 2 inches, 3 inches, 5 inches, 10 inches, etc.).

Figure 10:
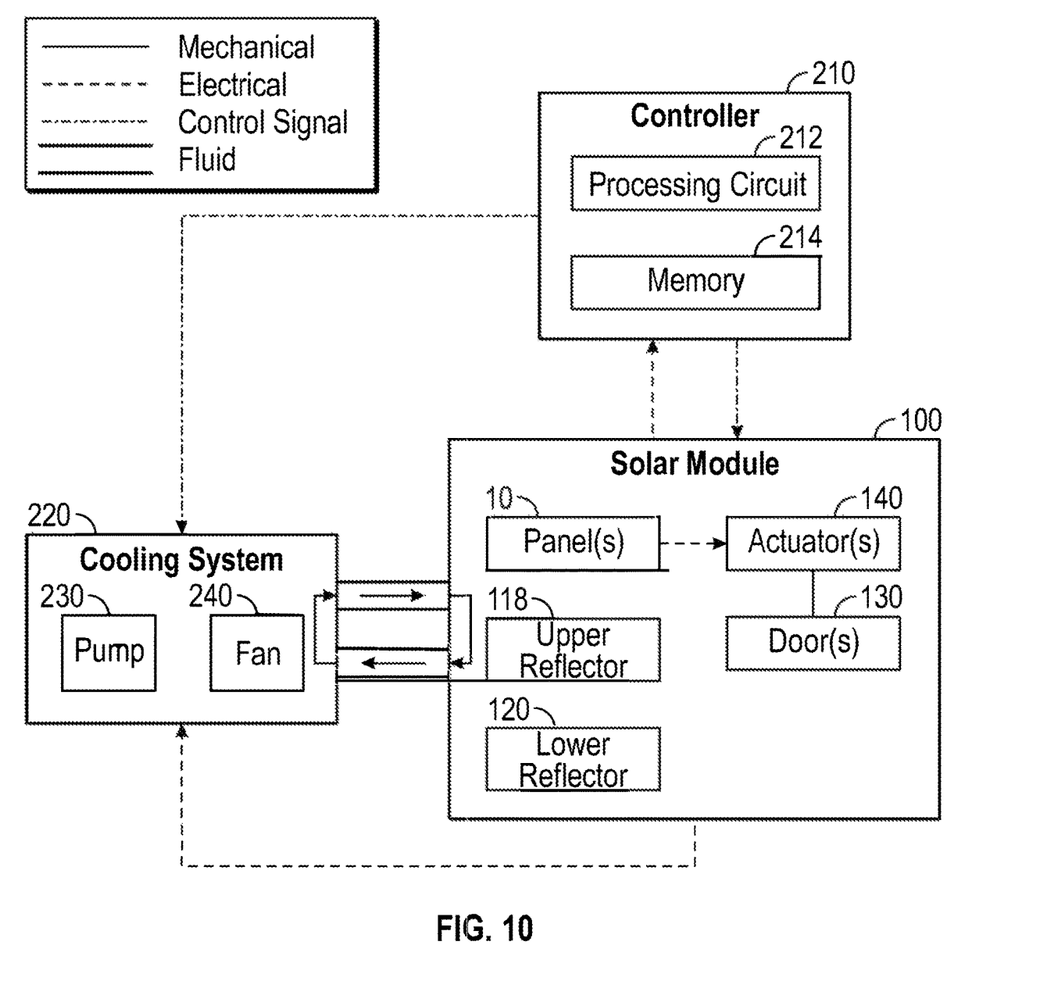
FIG. 10 is a schematic block diagram of a solar panel system including a controller, a solar module, and a cooling system, according to an exemplary embodiment.

As shown in FIG. 10, a panel system, shown as solar panel system 200, includes the solar module 100, a control system, shown as controller 210, and a panel cooling system, shown as cooling system 220. In one embodiment, the controller 210 is configured to selectively engage, selectively disengage, control, or otherwise communicate with components of the solar module 100 and/or the cooling system 220. As shown in FIG. 10, the controller 210 is coupled to (e.g., communicably coupled to, electrically coupled to, etc.) the solar module 100 and the cooling system 220. By way of example, the controller 210 may send and receive signals (e.g., control signals) with the solar module 100 and/or the cooling system 220. According to an exemplary embodiment, the solar module 100 is configured to supply electricity produced thereby to power the controller 210, the cooling system 220, and/or the door actuators 140 thereof.

The controller 210 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 10, the controller 210 includes a processing circuit 212 and a memory 214. The processing circuit 212 may include an ASIC, one or more FPGAs, a DSP, circuits containing one or more processing components, circuitry for supporting a microprocessor, a group of processing components, or other suitable electronic processing components. In some embodiments, the processing circuit 212 is configured to execute computer code stored in the memory 214 to facilitate the activities described herein. The memory 214 may be any volatile or non-volatile computer-readable storage medium capable of storing data or computer code relating to the activities described herein. According to an exemplary embodiment, the memory 214 includes computer code modules (e.g., executable code, object code, source code, script code, machine code, etc.) configured for execution by the processing circuit 212. In some embodiments, the controller 210 may represent a collection of processing devices (e.g., servers, data centers, etc.). In such cases, the processing circuit 212 represents the collective processors of the devices, and the memory 214 represents the collective storage devices of the devices.

As shown in FIG. 10, the cooling system 220 includes a first cooling element, shown as cooling pump 230, and a second cooling element, shown as cooling fan 240. In some embodiments, the cooling system 220 only includes one of the cooling pump 230 or the cooling fan. The cooling pump 230 (e.g., as part of a refrigeration cycle) may be configured to provide a working fluid (e.g., a cooled fluid, water, refrigerant, a clear working fluid, etc.) to one or more transparent conduits positioned throughout the inner chamber 116 of the panel housing 110 to facilitate at least partially cooling the solar panels 10 within the inner chamber 116.

The cooling pump 230 may be configured to additionally or alternatively pump the working fluid through the fluid tubing 160 within the fluid channel 150 of the upper reflector 118 and/or the lower reflector 120. In some embodiments (e.g., in embodiments where the upper reflector 118 and/or the lower reflector 120 do not include fluid tubing 160), the cooling pump 230 may be configured to pump the working fluid directly through the fluid channel 150 of the upper reflector 118 and/or the lower reflector 120. As the working fluid flows through the solar module 100 (e.g., through the inner chamber 116, through the upper reflector 118, through the lower reflector 120, etc.), the working fluid may be heated by the light entering the solar module 100. In some embodiments, a plurality of the solar modules 100 may be arranged in a series together and the working fluid may pass through the solar modules 100 (e.g., slowly, at a speed to facilitate sufficient heat transfer, etc.). The heated working fluid may boil or may not boil. The heated working fluid may be harvested to produce electricity (e.g., in a steam turbine where the working fluid boils to provide steam that may be harnessed by the steam turbine to produce electricity, etc.). In embodiments where upper reflector 118 and/or the lower reflector 120 are curved, the light reflected thereby may be concentrated at the fluid channel 150 and/or the fluid tubing 160 (e.g., increasing the heating of the working fluid flowing therethrough, the fluid tubing 160 within the fluid channel 150, the fluid tubing 160 along an interior surface thereof, etc.)

Additionally or alternatively, the cooling fan 240 may be configured to provide an airflow throughout the inner chamber 116 of the panel housing 110, within the upper reflector 118, and/or the lower reflector 120 to facilitate at least partially cooling the solar panels 10 within the inner chamber 116. In one embodiment, the cooling fan 240 is positioned within the inner chamber 116. In another embodiment, the cooling fan 240 provides an airflow to the inner chamber 116 of the panel housing 110 through one or more transparent conduits positioned throughout the inner chamber 116 of the panel housing 110, within the upper reflector 118, and/or the lower reflector 120 to facilitate at least partially cooling the solar panels 10 within the inner chamber 116. In some embodiments, the cooling fan 240 is configured to provide the airflow across the one or more conduits through which the working fluid is flowing. The controller 210 may be configured to monitor a module temperature within the inner chamber 116 (e.g., via a temperature sensor) and control the cooling system 220 as needed to maintain the module temperature within a suitable operating temperature range.

According to an exemplary embodiment, the controller 210 is configured to control the door actuators 140 to open and close the doors 130 to selectively permit the incident light I to enter one or more of the slits 132. In one embodiment, the controller 210 is configured to control the door actuators 140 to open and close the doors 130 in a predetermined cycle across the solar module 100. By way of example, the controller 210 may be configured to control the door actuators 140 to open a first door 130 proximate a first end or side of the solar module 100 and then open the remaining doors 130 in series until the final door 130 proximate the opposing second end or side of the solar module 100 is opened. The controller 210 may be configured to control the cycle such that the doors 130 are opened in predetermined intervals (e.g., every second, 2 seconds, 3 seconds, 4 seconds, 5 seconds, etc.). In one embodiment, the controller 210 is configured to control the door actuators 140 to close a preceding door 130 at the same time as opening a subsequent door 130. In another embodiment, the controller 210 is configured to control the door actuators 140 to close the preceding door 130 before opening the subsequent door 130. In still another embodiment, the controller 210 is configured to control the door actuators 140 to close the preceding door 130 after opening the subsequent door 130. In some embodiments, the controller 210 is configured to control the door actuators 140 such that a couple of the doors 130 are open simultaneously. In one embodiment, the controller 210 is configured to control the door actuators 140 such that the amount of time that a respective door 130 is open is less than the amount of time the respective door 130 is closed between openings. In another embodiment, the controller 210 is configured to control the door actuators 140 such that the amount of time that a respective door 130 is open is greater than the amount of time the respective door 130 is closed between openings. In some embodiments, the amount of time that the doors 130 are open may be based on the amount of time it takes for light to travel into a respective slit 132, through the inner chamber 116 and the solar panel(s) 10, reflect off of the lower reflector 120, and return to the upper side 112 of the panel housing 110.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Language such as the phrases "at least one of X, Y, and Z" and "at least one of X, Y, or Z," unless specifically stated otherwise, is understood to convey that an element may be either X; Y; Z; X and Y; X and Z; Y and Z; or X, Y, and Z (i.e., any combination of X, Y, and Z). Thus, such language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the solar panel 10 (e.g., the non-transparent solar panel 20, the transparent solar panel 30, the stacked-cell transparent solar panel 40), the solar module 100, and the solar panel system 200 and components thereof as shown in the various exemplary embodiments is illustrative only. Additionally, any element disclosed in one embodiment may be incorporated or utilized with any other embodiment disclosed herein.

The invention claimed is:
1. A solar panel system comprising:
  a solar module including:
    a housing having a first side and an opposing second side, wherein the first side is configured to receive incident light; and
    a panel extending across the first side of the housing, the panel comprising:
      a plurality of flaps arranged adjacent to one another transversely along a length of the panel, wherein each flap is selectively openable to provide a slit for incident light to enter the housing and selectively closeable to block light from entering the housing, wherein a length of each slit varies transversely across the panel;
      for each flap of the plurality of flaps, an actuator operable to selectively open and close the respective flap;
      a controller operable to control the actuator associated with each flap of the plurality of flaps;

a solar panel supported by the housing, the solar panel having a solar cell layer configured to receive the incident light and convert a first portion of the incident light to electricity; and a reflector positioned to reflect a second portion of the incident light that is not converted to electricity by the solar panel back at the solar panel.

2. The solar panel system of claim 1, wherein the solar panel includes a plurality of transparent solar panels arranged in a stacked configuration.

3. The solar panel system of claim 1, wherein the solar panel has a thickness between three inches and twelve inches.

4. The solar panel system of claim 1, wherein the reflector is a reflective coating or reflective film disposed along a rear surface of the solar panel.

5. The solar panel system of claim 1, wherein the reflector is a panel having the reflective coating or reflective film disposed there along.

6. The solar panel system of claim 1, wherein the reflector is a first reflector, and wherein the solar module includes a second reflector positioned at or proximate the first side of the housing.

7. The solar panel system of claim 6, wherein the second reflector is a one-way window.

8. The solar panel system of claim 6, wherein the second reflector is positioned along an interior face of the panel.

9. The solar panel system of claim 1, further comprising a cooling system configured to provide at least one of a cooled working fluid or an airflow to at least one of an interior of the solar module or an internal channel of the reflector.

10. The solar panel system of claim 9, wherein the cooling system is configured to provide both the cooled working fluid and the airflow to the interior of the solar module.

11. The solar panel system of claim 9, further comprising a controller configured to monitor a temperature within the interior of the solar module and control the cooling system to maintain the temperature within a desired operating range.

12. The solar panel system of claim 1, wherein the solar module includes a dichroic element positioned at the first side of the housing.

13. The solar panel system of claim 1, wherein the reflector includes a series of triangle, pyramid, or conical-shaped elements.

14. The solar panel system of claim 1, wherein the solar panel is transparent, and the second portion of the incident light is light that passes through the solar panel.

15. The solar panel system of claim 1, wherein the solar cell layer includes a plurality of solar cell layers arranged in a stacked configuration.

16. The solar panel system of claim 1, wherein the reflector is positioned at or proximate the opposing second side of the housing.

17. The solar panel system of claim 1, wherein the reflector is a mirror or a reflective film.

* * * * *